(12) United States Patent
Kjerstad

(10) Patent No.: US 8,692,555 B2
(45) Date of Patent: Apr. 8, 2014

(54) SUBSEA, VERTICAL, ELECTROMAGNETIC SIGNAL RECEIVER FOR A VERTICAL FIELD COMPONENT AND ALSO A METHOD OF PLACING THE SIGNAL RECEIVER IN UNCOMPACTED MATERIAL

(75) Inventor: Jostein Kåre Kjerstad, Stavanger (NO)

(73) Assignee: Advanced Hydrocarbon Mapping AS, Stavanger (NO)

( * ) Notice: Subject to any disclaimer, the term of this patent is extended or adjusted under 35 U.S.C. 154(b) by 428 days.

(21) Appl. No.: 13/121,355

(22) PCT Filed: Sep. 18, 2009

(86) PCT No.: PCT/NO2009/000325
§ 371 (c)(1),
(2), (4) Date: May 6, 2011

(87) PCT Pub. No.: WO2010/039038
PCT Pub. Date: Apr. 8, 2010

(65) Prior Publication Data
US 2011/0210742 A1    Sep. 1, 2011

(30) Foreign Application Priority Data
Sep. 30, 2008    (NO) .................................. 20084133

(51) Int. Cl.
*G01V 3/00*    (2006.01)
(52) U.S. Cl.
USPC ......................................... 324/334; 324/344

(58) Field of Classification Search
None
See application file for complete search history.

(56) References Cited

U.S. PATENT DOCUMENTS

| | | | | |
|---|---|---|---|---|
| 4,654,598 | A | * | 3/1987 | Arulanandan et al. ......... 324/354 |
| 5,032,794 | A | * | 7/1991 | Ridd et al. ..................... 324/365 |
| 6,864,684 | B2 | * | 3/2005 | Ellingsrud et al. ............. 324/337 |
| 2009/0015262 | A1 | | 1/2009 | Strack et al. |

FOREIGN PATENT DOCUMENTS

| | | |
|---|---|---|
| EP | 0678758 A1 | 10/1995 |
| GB | 2413188 A | 10/2005 |
| WO | WO2005/006022 A1 | 1/2005 |
| WO | WO2007/053025 A1 | 5/2007 |

* cited by examiner

*Primary Examiner* — Minh N Tang
(74) *Attorney, Agent, or Firm* — Gable Gotwals

(57) ABSTRACT

A vertical receiver antenna device includes first and second receiving, electrode units interconnected by a receiver antenna cable and connected to means for the electromagnetic surveying of electrically resistive targets potentially containing hydrocarbons. The receiver antenna is arranged in a tubular, non-magnetic antenna housing arranged vertically in subsea uncompacted material, and one of the first and second receiving electrode units being connected in a electrically conductive manner to the underlying structure, and the other one of the first and second receiving electrode units being arranged in a portion of the antenna housing distantly from the first one of first and second receiving electrode units. A method of installing a vertical receiver antenna in subsea uncompacted material is also described,

15 Claims, 2 Drawing Sheets

SUBSEA, VERTICAL, ELECTROMAGNETIC SIGNAL RECEIVER FOR A VERTICAL FIELD COMPONENT AND ALSO A METHOD OF PLACING THE SIGNAL RECEIVER IN UNCOMPACTED MATERIAL

CROSS-REFERENCE TO RELATED APPLICATIONS

The application is the United States National Phase PCT Patent Application No. NO2009/000325 filed on 18 Sep. 2009, which was published in English on 8 Apr. 2010 under Publication No. WO 2010/039038 A1, which claims priority to Norwegian Patent Application No. 20084133 filed 30 Sep. 2008, both of which are incorporated herein by reference.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTIONIC FILING SYSTEM

Not Applicable

STATEMENT REGARDING PRIOR DISCLOSURES BY THE INVENTION OR A JOINT INVENTOR

Not Applicable

BACKGROUND OF THE INVENTION

There is described a vertical receiver antenna device for the electromagnetic surveying of electrically resistive targets potentially containing hydrocarbons, the receiver antenna being arranged in an antenna housing formed of a non-magnetic material, the antenna housing being arranged to be placed vertically in subsea uncompacted material and extending from a seabed downwards in the subsea uncompacted material. There is also described a method of installing a vertical receiver antenna in subsea uncompacted material.

When mapping subsea structures, for example in connection with the recovery of oil and gas, it is known to use electromagnetic mapping by measuring resistivity with a vertical field component, as it is disclosed in WO 2007/053025 A1, for example. In such mapping it is of vital importance that the orientation of a signal receiver is known, and in order to maintain high quality in the mapping data acquired, large resources are used to place the receiver dipole correctly and provide data for the relative position of the receiver dipole. It is particularly desirable to achieve accurate vertical positioning of the receiver.

WO2005/006022 A1 discloses devices and methods of mapping subsea structures by means of electromagnetically based (CSEM) resistivity measurements (CSEM), in which an EM receiver antenna is placed in the seabed and extends downwards in an underground structure. The receiver is placed in the seabed to improve and ensure the position, orientation, data quality and depth of surveying. A plurality of sensors are placed in a borehole.

BRIEF SUMMARY OF THE INVENTION

The invention has for its object to remedy or reduce at least one of the drawbacks of the prior art.

The object is achieved through features which are specified in the description below and in the claims that follow.

The invention relates to a non-magnetic antenna housing which is arranged to accommodate one or more vertical dipole antennas for receiving electromagnetic signals which are reflected from the underground during the electromagnetic mapping of potential subsea hydrocarbon deposits. The antenna housing is arranged to be moved down into subsea uncompacted material and thereby form a subsea space, in which the dipole antenna is placed in a stable position in both horizontal and vertical directions. The antenna housing is arranged to be moved down into the uncompacted material by impact, rotation or in another manner. An upper portion of the antenna housing projects above the uncompacted material and contains means for communication with a distant signal-processing plant, directly by continuous or periodic connection, or by signals which are stored temporarily in a first storage medium arranged in the antenna housing being transferred to a movable second storage medium and moved by means of a means of conveyance, for example a remote-operated vehicle (ROV), to the surface for connection to the signal-processing plant. The antenna housing is provided with means for connecting the dipole antenna in an electrically conductive manner to the surrounding uncompacted material.

In a first aspect the invention relates more specifically to a vertical receiver antenna device comprising first and second receiving electrode units interconnected by a receiver antenna cable and connected to means for the electromagnetic surveying of electrically resistive targets potentially containing hydrocarbons, characterized by the receiver antenna being arranged in an antenna housing comprising an elongated body formed of a non-magnetic material, the antenna housing extending from a seabed downwards in an underground structure, one of the first and second receiving electrode units being connected in an electrically conductive manner to the underground structure, and the other one of the first and second receiving electrode units being arranged in a portion of the antenna housing distantly from said first one of the first and second receiving electrode units.

The antenna housing may be substantially tubular.

The antenna housing may include means arranged to penetrate a portion of uncompacted material.

The antenna housing may include an apparatus compartment arranged to project above the seabed.

The antenna housing may include a receiver control unit.

The antenna housing may include means for signal communication with a distant signal-processing plant.

The antenna housing may include means for storing signals.

One of the first and second receiving electrode units may be arranged near an end portion of the antenna housing.

In a second aspect, the invention relates more specifically to a method of installing a vertical receiver antenna for the electromagnetic surveying of electrically resistive targets potentially containing hydrocarbons, characterized by the method including the steps of:

providing an antenna housing comprising an elongated body formed of a non-magnetic material;

arranging the receiver antenna in the antenna housing, one of first and second receiving electrode units being arranged distantly from the other one of said first and second receiving electrode units;

placing the antenna housing in an underground structure, the antenna housing extending vertically downwards from a seabed;

connecting, in an electrically conductive manner, one of the first and second receiving electrode units to the underground structure; and providing signal communication between the receiver antenna and a distant signal-processing plant.

The receiver antenna may be arranged in the antenna housing before the antenna housing is placed in the underground structure.

The signal communication between the receiver antenna and the distant signal-processing plant can be provided by continuous or periodic signal transmission, alternatively by intermediately storing the signal data locally on a first storage medium arranged in the antenna housing, transferring the signal data to a movable second storage medium, moving the second storage medium from the antenna housing to the surface by means of a means of conveyance, and connecting the second storage medium to the signal-processing plant.

One of the first and second receiving electrode units may be arranged near an end portion of the body of the antenna housing.

The antenna housing can be placed in the underground structure by pushing the elongated body down into subsea uncompacted material by means of an installation apparatus arranged on or above the seabed.

The installation apparatus may be arranged to place the elongated body in the uncompacted material by vibration, impact or rotation, or by a combination thereof.

BRIEF DESCRIPTION OF THE DRAWINGS

In what follows is described an example of a preferred embodiment which is visualized in the accompanying drawings, in which.

DETAILED DESCRIPTION OF THE INVENTION

Figure 1:
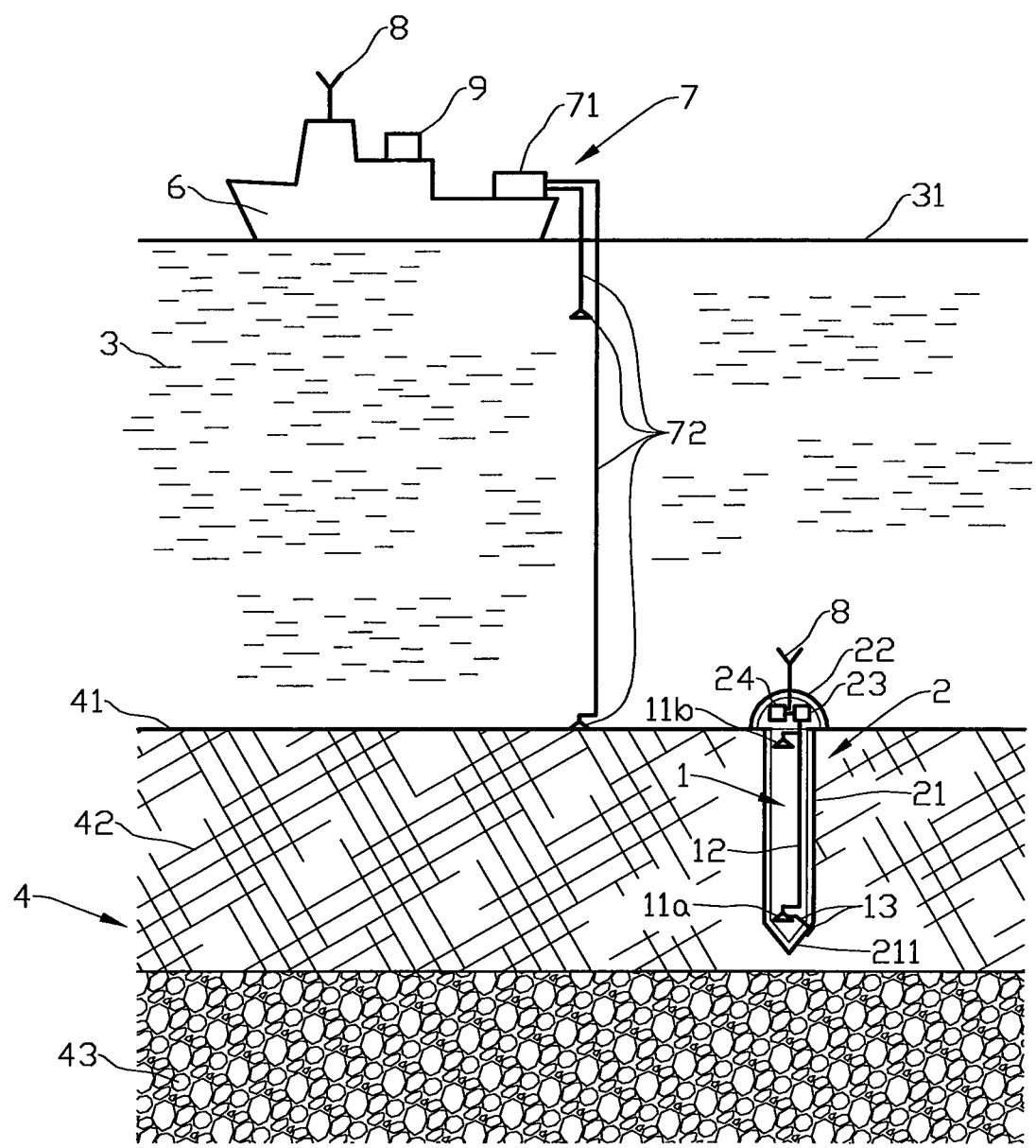
FIG. 1 shows a schematic side view of a device according to the invention and a vessel connected to a vertical electromagnetic transmitter.
Figure 2:
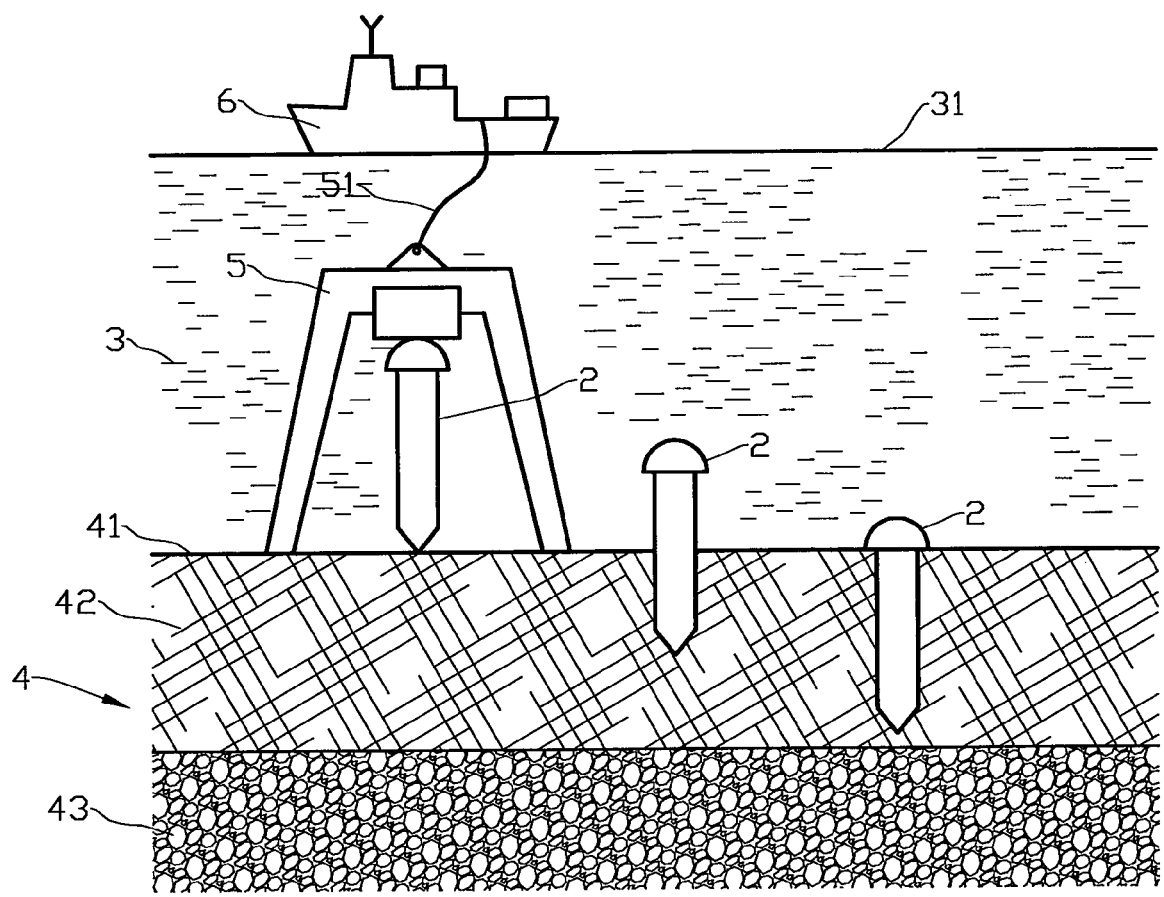
FIG. 2 shows schematically, on a smaller scale, three stages in the placing of the device according to the invention in subsea uncompacted material, an installation apparatus being shown only for the initial stage of installation.

In the figures, the reference numeral 1 indicates a prior-art vertical receiver antenna known per se, including first and second receiving electrode units 11a, 11b interconnected by means of a receiver antenna cable 12. Each receiving electrode unit 11a, 11b may include one or more electrodes in an appropriate configuration.

The receiver antenna 1 is arranged in an antenna housing 2 formed of a non-magnetic material. The antenna housing 2 is formed of a tubular body 21 which is provided, at one end portion, with an end cone 211 and, at another end portion, with an apparatus compartment 22. The first receiving electrode unit 11a is arranged distantly from the second receiving electrode unit 11b, the first receiving electrode unit 11a being arranged near the end cone 211, and the second receiving electrode unit 11b near the apparatus compartment 22. The receiver antenna 1 is connected to an earth connection 13 which is arranged to connect, in an electrically conductive manner, the receiver antenna 1 to an underground structure 4 surrounding the antenna housing 2 when it is in an operative position.

A potential surveying area in the form of said underground structure 4 includes a rock structure 43 with an overlying layer of uncompacted material 42. A seabed 41 forms the interface between the underground structure and an overlying mass of water 3.

A surface vessel, here illustrated as a ship 6, is positioned floating on a surface above said underground structure 4 which will be the object of an electromagnetic survey.

The end cone 211 of the antenna housing 2 is arranged to penetrate into the uncompacted material 42. An installation apparatus 5 is arranged to drive the antenna housing 2 down into the uncompacted material 42, so that only the upper portion of the antenna housing 2, that is substantially only the apparatus compartment 22, projects above the seabed 41. The installation apparatus 5 is connected to the surface vessel 6 by means of an umbilical 51 and is controlled from the surface vessel 6, which is also used for moving and positioning the installation apparatus 5 by appropriate means (not shown). The installation apparatus 5 is provided with means arranged to drive the antenna housing 2 down into the uncompacted material 42 by vibration, impact or rotation or other suitable methods.

The antenna housing 2 includes a receiver control unit 23 which is connected in a signal-communicating manner to the vertical receiver antenna 1 and a communication unit 24. In an alternative embodiment the antenna housing 2 accommodates an appropriate signal storage medium (not shown).

The surface vessel 6 is provided with a signal source 7 for generating electromagnetic signals of a suitable kind. The signals are transmitted into the underground structure 4 by a transmitter antenna 72 being arranged in the mass of water 3 and connected to a power generator 71 arranged on the surface vessel 6.

The surface vessel 6 and the antenna housing 2 are provided with signal communication means 8 which are connected to a signal-processing plant 9 arranged on the surface vessel 6, respectively the communication unit 24 arranged in the antenna housing 2.

When an area is to be mapped by an electromagnetic surveying of the underground 4, several receiver antennas 1 are placed in a predetermined pattern above the rock structure 43 by several antenna housings 2, each provided with a receiver antenna 1, being positioned on the seabed 41 and driven down into the uncompacted material 42 by means of the installation apparatus 5.

When the receiver antennas 1 are each placed in a respective antenna housing 2, the quality of the signal acquisition is improved as the verticality and position of each receiver antenna 1 are less affected by sea currents etc.

When a survey has been carried out, the receiver antenna 1 may be retrieved from the antenna housing 2, the antenna housing 2 being left in the uncompacted material 42, possibly for repeated use at a later time. Alternatively, the antenna housing 2 may be pulled from the uncompacted material 42 by a device (not shown) suitable for this.

By temporarily storing the signal data in the data storage medium (not shown) in the antenna housing 2, the signal data may be retrieved by moving the data storage medium, possibly on another data storage medium after having been transferred from the first one, by the use of a remote-operated vehicle (ROV). This may be useful when direct signal transmission between the communication unit 24 and surface vessel 6 is not possible.

The invention claimed is:

1. A vertical receiver antenna device including first and second receiving electrode units interconnected by a receiver antenna cable and connected to apparatus for the electromagnetic surveying of electrically resistive targets containing hydrocarbons, said receiver device comprising:
   receiver antenna arranged in an antenna housing having an elongated body formed of a non-magnetic material, the antenna housing extending from a seabed downwards within an underground structure; and
   one of the first and second receiving electrode units being connected in an electrically conductive manner to the underground structure, and the other one of the first and second receiving electrode units being arranged in a portion of the antenna housing distantly from said first one of the first and second receiving electrode units.

2. The device in accordance with claim 1, wherein the antenna housing is substantially tubular.

3. The device in accordance with claim 1, wherein the antenna housing includes an end means for penetrating a portion of the subsea uncompacted material.

4. The device in. accordance with claim 1, wherein the antenna housing includes an apparatus compartment arranged to project above the seabed.

5. The device in accordance with claim 1, wherein the antenna housing includes a receiver control unit.

6. The device in accordance with claim 1, wherein the antenna housing includes communication means for signal communication with a distant signal-processing plant.

7. The device it accordance with claim 1, wherein the antenna housing includes storage means for storing signals.

8. The device in accordance with claim 1, wherein one of the first and second receiving electrode units is arranged near an end portion of the antenna housing, 9. A method of installing a vertical receiver antenna for electromagnetic surveying of electrically resistive targets containing hydrocarbons, method includes the steps of:
   providing an antenna housing having an elongated body formed of a non-magnetic material;
   arranging the receiver antenna in the antenna housing, one of first and second receiving electrode units being arranged distantly from the other one of said first and second receiving, electrode units;
   placing the antenna housing in an underground structure, the antenna housing extending vertically downwards from a seabed;
   connecting, in an electrically conductive manner, one of the first and second receiving electrode units to the underground structure; and
   providing signal communication between the receiver antenna and a distant signal-processing plant.

10. The method in accordance with claim 9, wherein the receiver antenna is arranged in the antenna housing before the antenna housing is placed in the underground structure.

11. The method in accordance with claim 9, wherein the signal communication between the receiver antenna and the distant signal-processing plant is provided by continuous or periodic signal transmission.

12. The method in accordance with claim 9, wherein the signal communication between the receiver antenna and the distant signal-processing plant is provided by intermediately storing the signal data locally on a first storage medium arranged in the antenna housing, transferring the signal data to a movable second storage medium, moving the second storage medium from the antenna housing to the surface by means of conveyance and connecting the second storage medium to the signal-processing plant.

13. The method in accordance with claim 9, wherein one of the first and second receiving electrode units is arranged near an end portion of the body of the antenna housing.

14. The method in accordance with claim 9, wherein the antenna housing is placed in the underground structure by pushing the elongated body down into subsea uncompacted material by means of an installation apparatus arranged on or above the seabed.

15. The method in accordance with claim 14, wherein the installation apparatus is arranged to place the elongated body in the uncompacted material by vibration, impact or rotation or by a combination thereof.

* * * * *